United States Patent
Wen et al.

(10) Patent No.: US 7,359,859 B2
(45) Date of Patent: Apr. 15, 2008

(54) COMPUTER-BASED TRAINING SYSTEM AND METHOD FOR ENHANCING LANGUAGE LISTENING COMPREHENSION

(75) Inventors: Sayling Wen, Taipei (TW); Zechary Chang, Taipei (TW); Leger Wu, Beijing (CN)

(73) Assignee: Inventec Corporation, Taipei (TW)

( * ) Notice: Subject to any disclaimer, the term of this patent is extended or adjusted under 35 U.S.C. 154(b) by 888 days.

(21) Appl. No.: 10/445,053

(22) Filed: May 27, 2003

(65) Prior Publication Data

US 2004/0243418 A1    Dec. 2, 2004

(51) Int. Cl.
*G10L 21/00* (2006.01)
*G09B 7/00* (2006.01)
*G09B 5/02* (2006.01)

(52) U.S. Cl. ............ 704/270; 704/1; 704/207; 434/169; 434/159; 434/322

(58) Field of Classification Search .......... None
See application file for complete search history.

(56) References Cited

U.S. PATENT DOCUMENTS 5,503,560 A * 4/1996 Stentiford .......... 434/167
2002/0086269 A1 * 7/2002 Shpiro .......... 434/156
2002/0115044 A1 * 8/2002 Shpiro .......... 434/156
2002/0150869 A1 * 10/2002 Shpiro .......... 434/156

FOREIGN PATENT DOCUMENTS

JP    2002-108199    * 4/2002

OTHER PUBLICATIONS

"The Rosetta Stone 2000 User's Guide" Fairfield Language Technologies, 2000.*

* cited by examiner

*Primary Examiner*—V. Paul Harper
(74) *Attorney, Agent, or Firm*—Birch, Stewart, Kolasch & Birch, LLP

(57) ABSTRACT

The specification discloses a computer-based system and method for enhancing language listening comprehension. The system and method perform analyses according to the answers entered by the learner. The analysis result determines whether to increase or lower the voice-playing speed and whether to increase or decrease the problem difficulty.

6 Claims, 3 Drawing Sheets

COMPUTER-BASED TRAINING SYSTEM AND METHOD FOR ENHANCING LANGUAGE LISTENING COMPREHENSION

BACKGROUND OF THE INVENTION

1. Field of the Invention

The invention relates to a language learning system and method that utilize a computer to train the listening comprehension of the user and, in particular, to a computer-based system and method for enhancing language listening comprehension.

2. Related Art

With the advance in technologies, the information transportation speed has been tremendously increased. Therefore, the understanding and communications among different languages become very important. This very fact highlights the significance of listening comprehension in language learning.

The question is how to correctly and efficiently train the listening comprehension of learners. The current listening comprehension training technology mostly emphasizes upon repeated "listening" activities. A language learning machine, electronic dictionary, or repeater is used to repeatedly play a particular word or sentence. Although this type of training can increase the user's familiarity with the language, it still requires the user to make progress in intellectual understanding on his or her own.

Take the popular electronic dictionary as an example. After the user enters a word or sentence, the electronic dictionary normally provides the associated explanation and example sentences and the service of playing the voice for the word or sentence. Some electronic dictionaries further provide the so-called "follow-me" mechanism for the user to practice. However, such practices and services usually only repeat once. The user therefore has to make improvement mostly by himself or herself.

It is thus of great benefit if one can provides a training system and method that generate practice problems according to the user's current listening comprehension. Using this kind of systems or methods, the user's listening comprehension is believed to improve enormously.

SUMMARY OF THE INVENTION

In view of the problems in the prior art, the invention provides a computer-based training system and method for enhancing language listening comprehension. It mainly performs analyses according to answers entered by a learner. The analysis results are then used to determine whether to increase or reduce the voice-playing speed, or even used to determine whether to increase or decrease the difficulty of the problems.

It is an objective of the invention to provide a computer-based training system and method for enhancing language listening comprehension. Through the disclosed system and method, the training program can be adjusted to suit the learner's current listening comprehension, achieving the goal of enhancing his or her listening abilities.

To achieve the above objective, the disclosed system contains an analysis and comparison module, a level control module, a problem generation module, a problem type database, a timing unit, and a voice-playing unit.

The disclosed method includes the steps of: generating problems according to problem settings selected by the user; obtaining answering time and result; computing a period that the user spends on each problem; analyzing and obtaining an accuracy according to the answering result; obtaining an analysis result; sending out a command for changing settings according to the analysis result; and generating new problems according to the changed problem settings.

The invention can achieve the following effects:

1. The training method based upon the invention can effectively increase the listening comprehension ability of the learner; and 2. The analysis method in accord with the invention helps generating problems that are suitable for the learner's current listening ability.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The computer-based training system and method for enhancing language listening comprehension perform analyses according to an answer entered by the learner for a problem. The analysis result is then used to determine whether to increase or reduce the voice-playing speed. It may even be used to determine whether to increase or decrease the difficulty of the next problem. The invention can effectively increase the listening comprehension ability of the learner.

Figure 1:
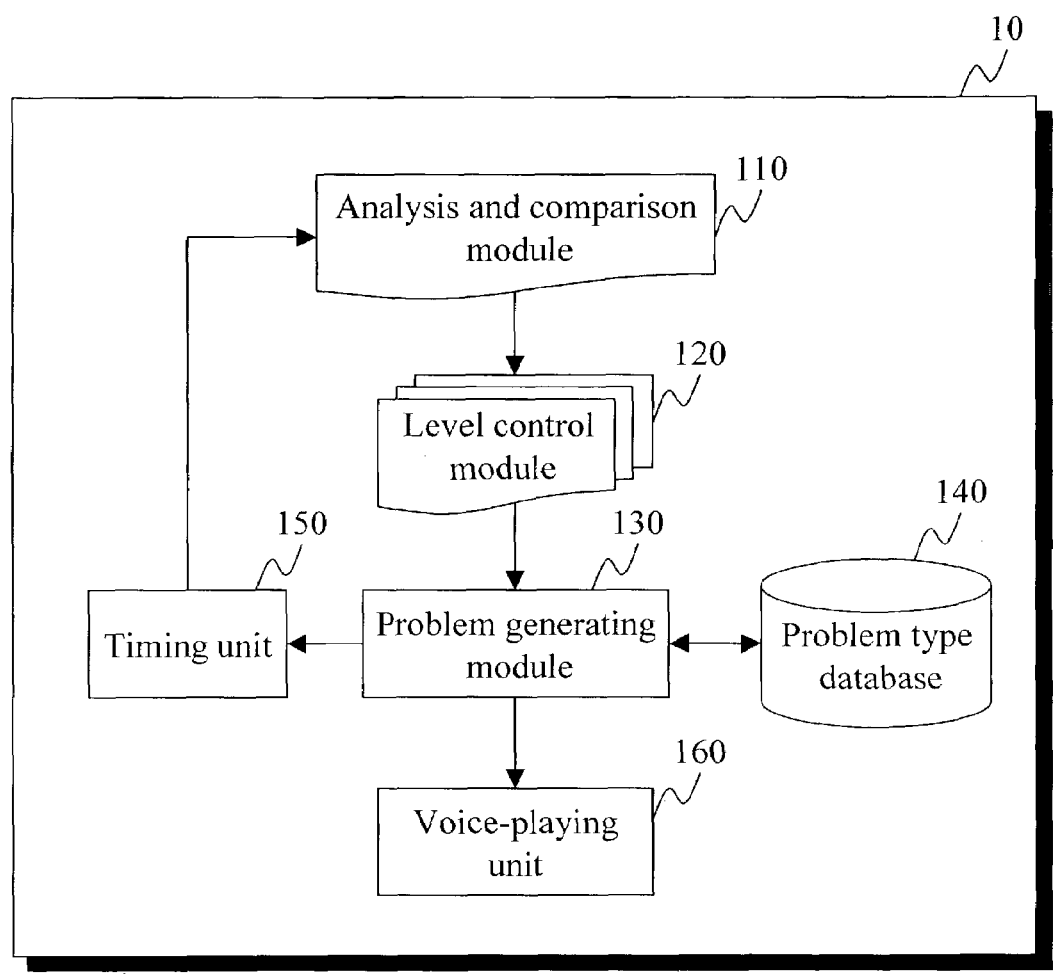
FIG. 1 shows the structure of the disclosed training system for improving language listening comprehension.
Figure 1:
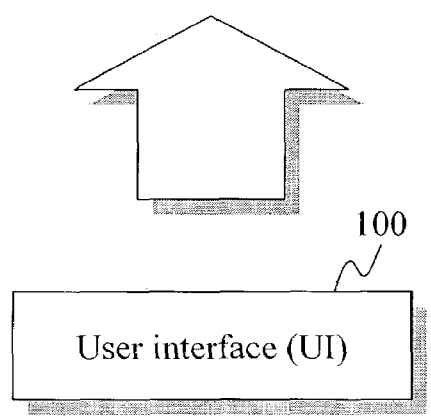

We use FIG. 1 to illustrate the system structure of the invention. The learner uses a user interface (UI) 100 to operate the listening comprehension training system 10. The listening comprehension training system 10 in accord with the invention contains an analysis and comparison module 110, a level control module 120, a problem generating module 130, a problem type database 140, a timing unit 150, and a voice-playing unit 160.

The analysis and comparison module 110 analyzes the answer keyed in by the user and outputs an analysis result. The level control module 120 determines the problem difficulty and voice-playing speed according to the analysis result or setting information for generating problems. The problem generating module 130 extract language information according to the problem difficulty and plays voices according to the voice-playing speed. The problem type database 140 stores problems at different levels of difficulties. The timing unit 150 records the answering time of the learner. The voice-playing unit 160 plays voices according to the voice-playing information provided by the problem generating module 130.

When the learner uses the disclosed system to improve his or her listening comprehension, the level control module 120 first allows the learner to select problem difficulty levels and voice-playing speeds. Afterwards, the problem generating module 130 retrieves from the problem type database 140 problems in accord with the difficulty level and the voice-playing speed. The selected problem is then sent to the voice-playing unit 160 to play. The timing unit 150 records the time the leaner uses to answer the problem, which is also used to determine in part the difficulty level and voice-playing speed of the next problem.

After the learner finishes answering the problem, the analysis and comparison module 110 determines whether the learner's answer is correct. Combining the accuracy of the answer obtained by the analysis and comparison module 110 and the answering time provided by the timing unit 150, the level control module 120 determines a suitable difficulty level and voice-playing speed for the user. Such information is again sent to the problem generating module 130 to make the next problem. Therefore, the invention achieves the goal of providing problems suitable for the learner to improve the learner's listening comprehension.

Figure 2:
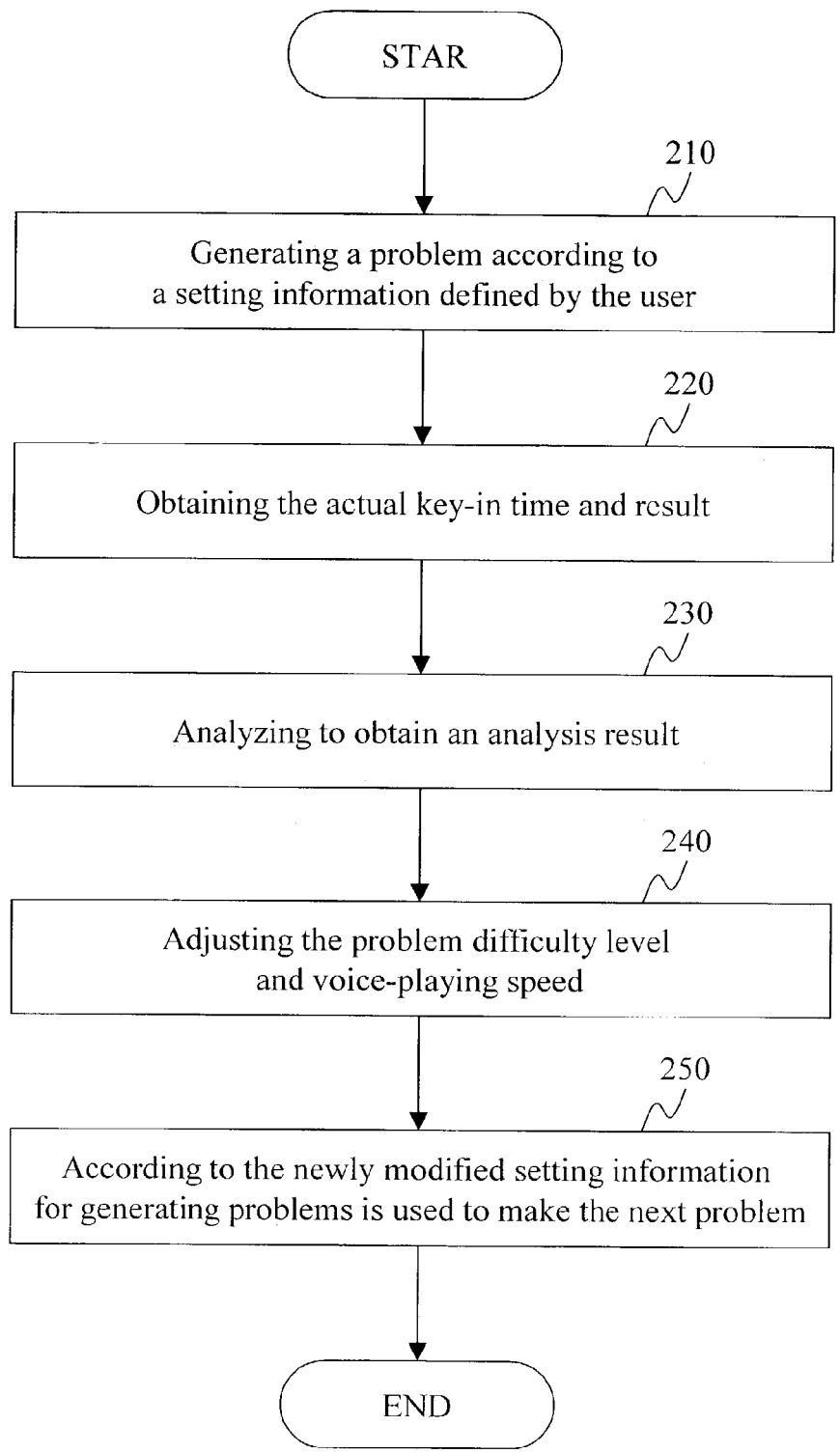
FIG. 2 is a main flowchart of adjusting the voice-playing speed and the problem difficulty level in accord with the invention.

We use FIG. 2 to explain the main procedure of the disclosed method. First, the system provides options of problem difficulty levels and voice-playing speeds for the user to choose. At this moment, the user can make selections according to the provided information. The system then generates a problem according to the setting information defined by the user (step 210). The system also starts to record the answering time. After the user keys in an answer, the system obtains the actual key-in time and result (step 220). The key-in time and result are used for analysis to obtain an analysis result (step 230). The analysis result is then used to adjust the problem difficulty level and voice-playing speed of the next problem (step 240). The newly modified setting information for generating problems is used to make the next problem (step 250).

Figure 3:
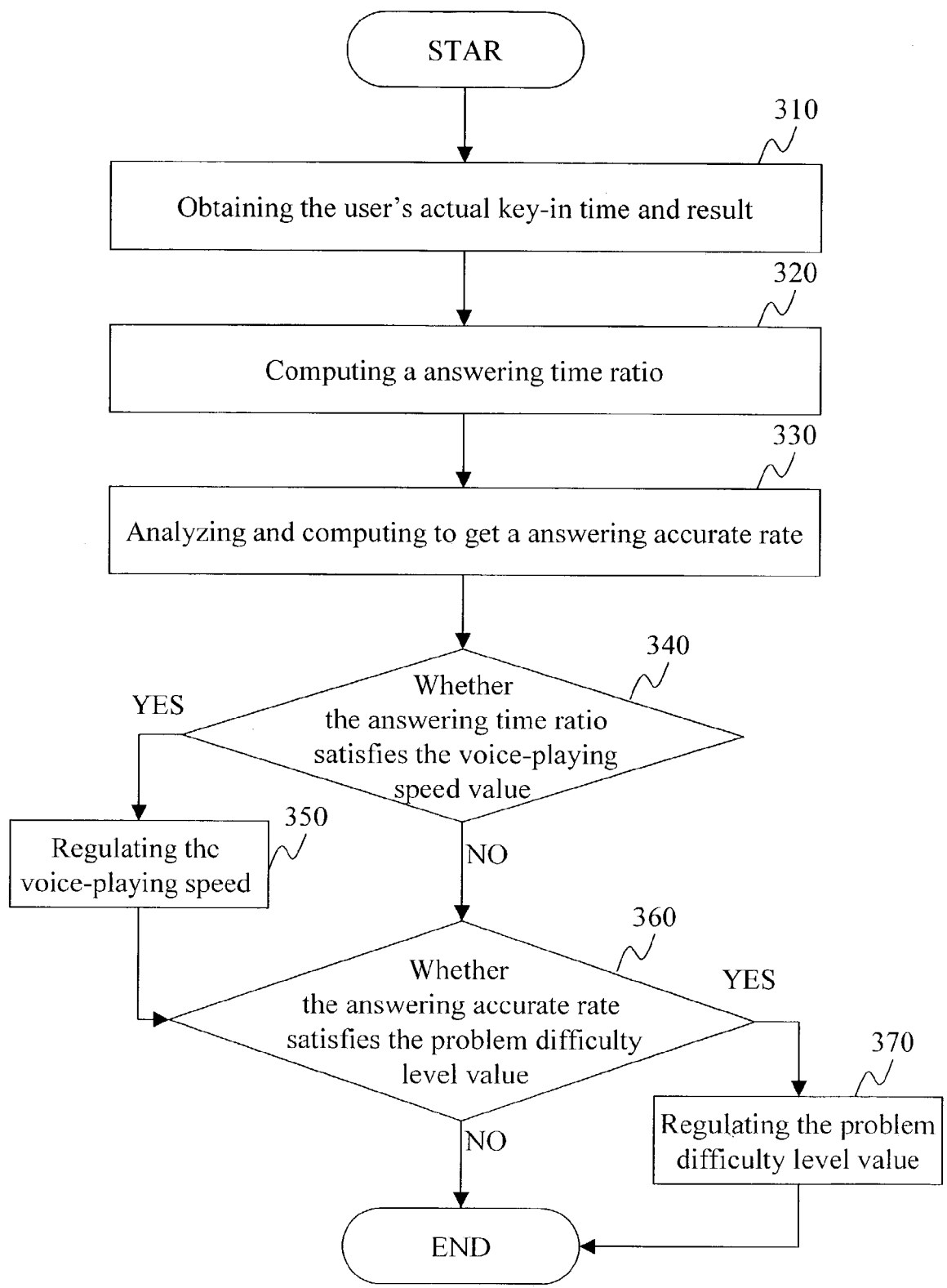
FIG. 3 is a detailed flowchart of FIG. 2.

After the explanation of FIG. 2, we use FIG. 3 to further describe the process of adjusting the setting information for generating problems. As shown in the drawing, after the system obtains the user's actual key-in time and result (step 310) the system computes a answering time ratio by dividing the actual answering time by a standard key-in time set by the difficulty level of the problem (step 320). The system further compares the key-in result with the correct answer of the problem, computing an accuracy (step 330). The answering time ratio and the accuracy are combined to provide an analysis result, which is then used for subsequent problem formation and analyses.

The above-mentioned analysis and comparison procedure first analyzes the answering time ratio, determining if the ratio calls for a change in the voice-playing speed (step 340). If the answering time ratio is good enough for the user to go on to the next level of voice-playing speed, it is then modified accordingly by the system to play the problem at a higher speed (step 350). If the answering time ratio is not good enough, the next problem is played at a lower speed (step 350). If the answering time ratio is between the above two criteria, then the next problem is played at the present speed. Alternatively, it can be played at a slower speed, if necessary.

After the answering time ratio analysis, the system performs the analysis of answering accuracy to see if the answer satisfies the problem difficulty level setting (step 360). Once the accuracy reaches the requirement of the next level of difficulty, the system promotes to the next higher level for making future problems (step 370). If the accuracy does not reach the basic standard of the current level of difficulty, the system reduces to the next lower level for making future problems (step 350). If the accuracy satisfies the requirement of the current level of difficulty, the system can either stay at this level of difficulty or reduce down to the next lower level, if necessary.

Through the above-mentioned internal adjustments and settings, the user can receive a series of appropriate training to improve his or her listening comprehension using the disclosed system and method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-based training method for improving language listening comprehension by analyzing an answering result of a problem input by a user and determining a voice-playing speed and a difficulty level of a next problem, the method comprising the steps of:

obtaining an answering time and an answering result;

computing an answering time ratio by dividing the answering time by a standard key-in time;

obtaining an answer accuracy by comparing the answer result and a correct answer of the problem;

analyzing the answering time ratio and a voice-playing speed setting to generate an analysis result of the answer time ratio; and modifying the voice-playing speed of the next problem according to the analysis result of the answering time ratio;

analyzing the answering accuracy and a problem difficulty level setting to generate an analysis result of the answering accuracy; and modifying the difficulty level of the next problem according to the analysis result of the answering accuracy.

2. The computer-based training method for improving language listening comprehension of claim 1, wherein the problem difficulty level setting and the voice-playing speed setting refer to the problem setting information.

3. The computer-based training method for improving language listening comprehension of claim 2, further comprising the steps of:

providing and receiving the problem setting information;

selecting a problem according to the problem setting information; and playing voice and recording an answering time according to the problem setting information.

4. The computer-based training method for improving language listening comprehension of claim 3, wherein the answering time refers to the time for the user to key in the answering result.

5. The computer-based training method for improving language listening comprehension of claim 1, wherein the step of analyzing the answering time ratio and a voice-playing speed setting is a step of determining whether the answering time ratio satisfies the voice-playing speed setting value.

6. The computer-based training method for improving language listening comprehension of claim 1, wherein the step of answering accuracy and a problem difficulty level setting is a step of determining whether the answering accuracy satisfies the problem difficulty level value.

* * * * *